P. J. HENTSCHEL.
MEANS FOR DISPENSING BEVERAGES.
APPLICATION FILED JULY 25, 1917.
1,247,678.
Patented Nov. 27, 1917.
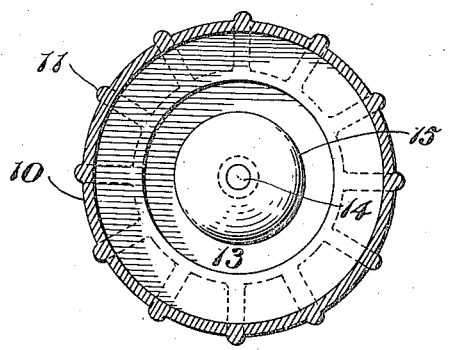
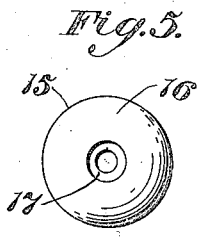
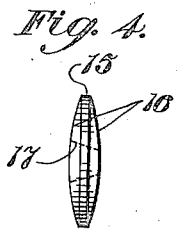
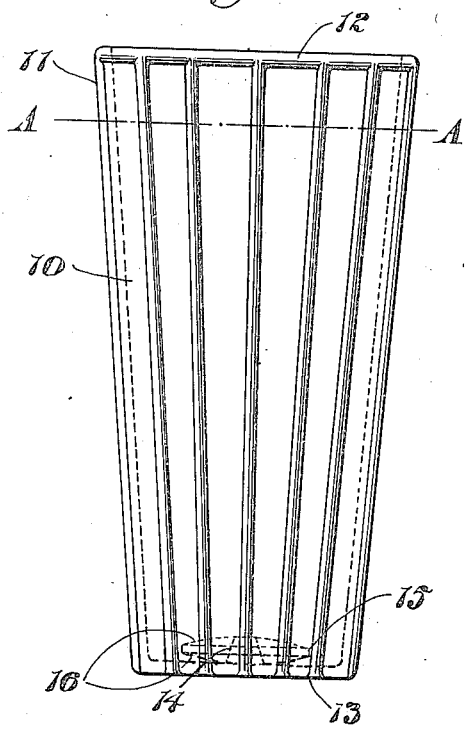
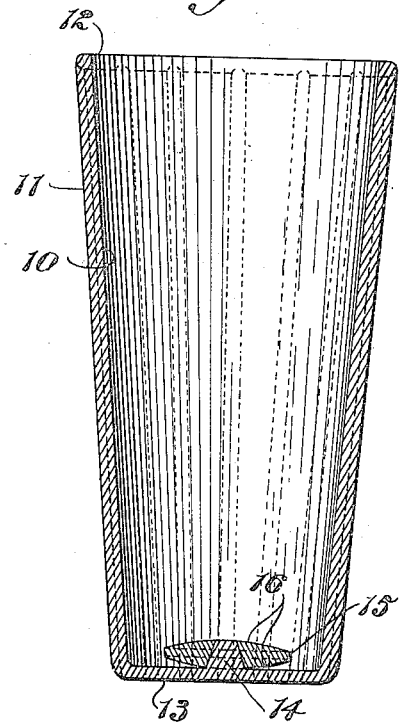

UNITED STATES PATENT OFFICE.

PAUL J. HENTSCHEL, OF BALTIMORE, MARYLAND.

MEANS FOR DISPENSING BEVERAGES.

1,247,678.  Specification of Letters Patent.  Patented Nov. 27, 1917.

Application filed July 25, 1917. Serial No. 182,623.

*To all whom it may concern:*

Be it known that I, PAUL J. HENTSCHEL, a citizen of the United States, residing at Baltimore, in the State of Maryland, have invented certain new and useful Improvements in Means for Dispensing Beverages; and I do hereby declare the following to be a full, clear, and exact description of the invention, such as will enable others skilled in the art to which it appertains to make and use the same.

My invention relates to a new means for dispensing beverages.

One object of my invention is to provide an edible dispensing receptacle for beverages.

Another object of my invention is to provide a compressed tablet containing suitable elements for producing a beverage when water is placed within the receptacle.

Another object of my invention is to shape said tablet so that it may readily be secured within said receptacle.

In carrying out my invention, I make use of the instrumentalities illustrated in the accompanying drawings, in which:—

Figure 1 is an elevation of my improved receptacle.

Fig. 2 is a central longitudinal section thereof.

Fig. 3 is a section along the line A—A in Fig. 1 looking downwardly.

Fig. 4 is a side view of my improved tablet.

Fig. 5 is a plan view of my improved tablet.

In the drawings, 10 represents my improved receptacle which is formed frusto-conoidal in shape, the outer surface of the frustum being provided with a plurality of strengthening ribs such as 11, said ribs being provided remote from the liquid forming the beverage so as to provide strength should the interior of the frustum become soft owing to saturation with the liquid forming the beverage. This is an especially valuable feature of my invention as it enables me to provide an edible receptacle which shall retain its shape for a reasonable time while holding the beverage.

The receptacle is provided with a lip rim 12 and a bottom 13.

The bottom 13 is provided with a frusto-conoidal stud 14 for a purpose hereinafter explained.

The receptacle just described may be composed of any suitable materials which are capable of being molded into the form shown and afterward, dried or baked in any approved manner, and which shall be able to retain the beverage for a reasonable time and which shall be capable of easy digestion.

I find that one suitable composition for making these receptacles is obtained by mixing together one tablespoonful of cocoanut oil, one-quarter pound powdered sugar, two pounds of flour, three gills of milk or water and one teaspoonful of yeast powder, which composition is either molded into form and then baked or molded with hot dies and thus baked during the process of molding.

The composition of the receptacle and the means for forming same may be greatly varied.

The receptacle just described may be used for ice cream, ices and beverages and afterward, eaten, but in order to provide a ready means for obtaining a beverage, I provide the tablet illustrated in Figs. 4 and 5, which is formed out of suitable materials and has a cylindrical outer surface 15 and two lenticular surfaces 16. A tapered hole 17 extends through the body of the tablet.

This tablet is composed of a mixture of sugar or saccharin with citric, tartaric or any other suitable fruit or other acid. The active elements alone of the tablet may be compressed into the form shown in Figs. 4 and 5, or said elements may be mixed with any other binding or other material before they are so formed.

After the receptacle is formed, as shown in Figs. 1, 2 and 3, and after the tablet is formed, as shown in Figs. 4 and 5, any suitable plastic material is applied to the interior of the hole 17, which plastic material may be the batter of which the receptacle is composed, and then the tablet is placed upon the stud 14, as shown in Figs. 1, 2 and 3.

The manner of use of my receptacle is as follows:—

Water is placed within the interior of the receptacle 19, this dissolves the tablet and produces a beverage. The beverage slowly permeates the receptacle 10 and after the beverage has been drunk, the receptacle 10 can then be eaten.

It is evident that the receptacle 10 will be flavored by the beverage which has been contained within the interior thereof.

I claim:

1. An edible receptacle comprising a body portion, bottom and a soluble tablet secured on said bottom.

2. An edible receptacle comprising a body portion, lip rim, bottom and ribs on said body extending from said lip rim to said bottom.

3. An edible receptacle comprising a body portion, bottom and a stud on said bottom.

4. An edible receptacle comprising a body portion, bottom, a stud on said bottom and a soluble tablet secured on said stud.

5. An edible receptacle comprising a liquid retaining body portion and strengthening ribs remote from the surface retaining said liquid.

In testimony whereof I affix my signature.

PAUL J. HENTSCHEL.